3,702,352
CRYSTALLINE BLOCK COPOLYMERS OF ALIPHATIC ALPHA-OLEFINS AND PROCESS OF PREPARING SAME
Irving Leibson, Wyckoff, N.J., assignor to Dart Industries Inc., Los Angeles, Calif.
No Drawing. Continuation of abandoned application Ser. No. 610,502, Jan. 20, 1967. This application Nov. 16, 1970, Ser. No. 90,124
Int. Cl. C08f 15/04
U.S. Cl 260—878 B                    9 Claims

ABSTRACT OF THE DISCLOSURE

Novel compositions of block copolymers of alpha-olefins and processes therefor which compositions have improved contact clarity when molded over compositions of the prior art processes. The compositions comprise (a) 80% to 95% by weight of a pre-segment consisting essentially of a random copolymer of (1) 90–98.5 mole percent of an alpha-olefin having 2 to 9 carbon atoms and (2) 1.5–10 mole percent of an alpha-olefin having 2 to 9 carbon atoms different from (1), (b) 5% to 20% by weight of a post-segment consisting essentially of a homopolymer of an alpha-olefin having 2 to 9 carbon atoms which is the same as (a) (1).

---

This application is a continuation of Ser. No. 610,502, filed Jan. 20, 1967 and now abandoned.

This invention pertains to novel crystalline block copolymers of aliphatic alpha-olefins having transparency and contact clarity physical properties as well as improved melt strength as determined by extrusion of a parison in a blow molding operation as well as other improved properties.

Since the advent of commercial crystalline polypropylene resin in the late 1950's as a low cost competitor of polyethylene resin, a great amount of research effort has been expended by the industry in attempting to modify the physical properties of this low cost thermoplastic to make it adaptable to end use applications from which it was hitherto substantially precluded due to certain inherent physical property limitations. One such limitation, which substantially precluded the use of crystalline polypropylene in low temperature uses, was the tendency of this thermoplastic to embrittle at ambient or lower temperatures so that in such applications it remained substantially non-competitive. To resolve this physical property limitation industrial research turned to copolymerization of propylene with other alpha-olefin monomers with the result that a new series of competitive thermoplastic resins comprising block as well as random copolymers of propylene have now appeared on the market in large scale. In particular, block copolymers of propylene and ethylene have been developed which combine the best properties of both their homopolymer counterparts. For example, the desirable low temperature brittleness properties of polyethylene resin have been combined with the desirable stiffness and tensile properties of polypropylene resin in block copolymers of these (see British Pats. 889,659, 941,087, 997,250 and 1,018,283).

Recently, industry has turned a major research effort towards the development of transparency and clarity in thermoplastic resins for use in the packaging field where, esthetically at least, a transparent and clear bottle can, for example, compete more favorbly than a transparent but hazy counterpart or one where both transparency and clarity are lacking. This challenge has been met to some extent in the packaging field by clear and transparent polyvinyl chloride resin molded containers and modifications of this thermoplastic. Serious additive stability and cost problems however, at least from a competitive and food additive standpoint, beset the polyvinyl chloride resins and as a consequence, inroads into packaging areas has been limited in this country. A need has once more arisen, therefore, for a low cost thermoplastic resin possessing, in addition to good low temperature impact resistance and brittleness properties, transparency and at least a certain degree of clarity.

Some effort has reportedly been made in the recent history of polypropylene to enhance clarity of thin sections of this material, notably thin films, by the use of certain nucleating agents such as metal salts of benzoic acid. This approach, however, has essentially still not resolved the problem of clarity or contact clarity and transparency for thicker sections such as 5 to 100 mil sections employing low cost polypropylene resins possessing the other desirable properties of impact strength at low temperatures and melt strength while retaining substantially the desired stiffness and tensile properties thereof.

SUMMARY OF THE INVENTION

A general object of this invention is the provision of new compositions of alpha olefin block copolymers possessing transparency, contact clarity, improved melt strength and toughness.

A specific object of this invention is the provision of novel block copolymers of propylene and ethylene which, when molded into thin sheets or containers and similar articles having thin sections, exhibit contact clarity, transparency and improved melt strength as well as improved low temperature brittleness and impact properties. Other objects will become apparent from a reading of this specification.

In accordance with this invention, novel compositions of alpha-olefin block copolymers are herein provided which comprise a chain segment A and attached thereto a chain segment B, chain segment A consisting essentially of a random copolymer of at least two alpha-olefin monomers having from 2 to 9 carbon atoms, at least one of said alpha-olefin monomers constituting on a molar basis from 90 to 99% of said random copolymer, said chain segment A having an average molecular weight of from 50,000 to 500,000, exhibiting a crystalline structure under the X-rays and constituting essentially from 60 to 96% by weight of the total composition of A and B segments; and, chain segment B consisting essentially of a homopolymer of an alpha-olefin monomer having from 2 to 9 carbon atoms having an average molecular weight of from about 20,000 to about 2,000,000, exhibiting a substantial crystalline structure under the X-rays and constituting essentially from 40 to 4% by weight of the total composition.

As used in this specification, the term "contact clarity," a unique feature of those resins made from block copolymers of propylene and ethylene in accordance with this invention, means that bottles or thin sections such as sheets of from 5 to 100 mils thickness, preferably 5 to 25 mils, while translucent or transparent in appearance, will upon contact with an object such as a colored liquid or a solid of any type, permit the object to be viewed clearly, that is, in the case of a colored liquid, the color comes through clearly while in the case of a solid object such as print on a piece of paper, the print comes through clearly as if the thin section were made of glass. The clarity of the resin after contact with the object is comparable to clear polyvinyl chloride (thin) sections. Furthermore, when industrial items such as bottles are deformed, no noticeable residual stress lines (blush) remain in the bottle.

This invention is of general scope and encompasses the preparation of block copolymers of aliphatic alpha-olefins wherein the copolymers are formed of a first polymeric chain segment A to which (it is believed) a second polymeric chain segment B is chemically united (the designations "A" and "B" segments are used herein to aid in understanding the nature of the copolymers).

The polymeric chain segment A, according to the foregoing, constitutes, in the synthesis of the copolymer, a prepolymer containing active catalytic residues onto which, by virtue of said catalytic residues, a further polymeric chain can be formed or attached. The polymeric chain segment A is composed of a major proportion of an alpha-olefin containing from 2 to 9 carbon atoms, that is, from 90 to 99 percent on a mole basis, and a minor proportion of a different alpha-olefin of from 2 to 9 carbon atoms copolymerized in random fashion so as to obtain a random copolymer chain which nevertheless exhibits crystallinity under the X-rays and has an average molecular weight, as determined by intrinsic viscosity measurements in Decalin at 135° C. (as expressed in deciliters per gram-dl./g.), of from 50,000 to 500,000 (intrinsic viscosity from about 0.76 to 3.30 dl./g.). The polymeric chain segment A also constitutes a major proportion of the synthesized block copolymer composition, ranging from 60 to 96 percent by weight of the total.

The alpha-olefin constituting from 90 to 99 percent on a molar basis of the polymeric chain segment A can be ethylene, propylene, 4-methyl-pentene-1,3-methylbutene-1, 3,3-dimethylbutene-1, 3,4-dimethylhexene-1, that is, an alpha-olefin of from 2 to 9 carbon atoms, while the comonomer can be one or more of these but other than the alpha-olefin constituting the 90 to 99 percent component. The polymeric chain segment A can thus be composed of from 90 to 99 percent on a molar basis of 4-methyl-pentene-1 monomer units copolymerized with 1 to 10 percent on a molar basis of hexene-1, or octene-1 units or 90 to 99 percent ethylene on a molar basis with 1 to 10 percent propylene or butene-1 on a molar basis to form the prepolymer chain segment A, which in turn will constitute from 60 to 96 percent by weight of the total composition of polymeric chain segments A and B.

The polymeric chain segment A exhibits crystallinity under the X-rays and this property is essential for maintaining stiffness and tensile values at a maximum and aiding favorably impact and low temperature brittleness properties. The percent crystallinity as measured by X-rays of the chain segment A will be substantial and will depend on the particular amount of comonomer used, that is, 2 percent versus 10 percent but, of course, will not be as high in comparison to a homopolymer of the alpha-olefin monomer which is used in major amounts and is prepared in the absence of the comonomer.

The polymeric chain segment B is formed by homopolymerizing an alpha-olefin monomer of from 2 to 9 carbon atoms onto the polymeric chain segment A (prepolymer) containing active catalyst residues. Chain segment B is highly crystalline under the X-rays and has an average molecular weight, as determined by intrinsic viscosity measurements in Decalin at 135° C. of from 20,000 to 2,000,000 (intrinsic viscosity about 0.42 to 8.1 dl./g.). Chain segment B in the block copolymer compositions of this invention constitutes from 4 to 40 percent by weight of the total composition.

The alpha-olefin monomer used in forming polymeric chain segment B can be any alpha-olefin of from 2 to 9 carbon atoms such as ethylene, propylene, 4-methyl-pentene-1, 3-methyl-butene-1, 3,3-dimethyl-butene-1 and 3,4-dimethyl-hexene-1 but is preferably the same alpha-olefin monomer as that used in major proportion in polymeric chain segment A. Thus, if propylene is used as a major component in the prepolymer chain segment A then propylene is used as the homopolymer in chain segment B. As stated above, chain segment B is highly crystalline and this property is also essential for maintaining stiffness and tensile values and particularly toughness and impact strength in the case where propylene is used as the monomer.

In the preparation of the foregoing block copolymer compositions hydrogen is employed to control molecular weight. The use of hydrogen is particularly important in preparation of polymer chain segment A in order to maintain an average molecular weight of this prepolymer within the range of 50,000 to 500,000. Hydrogen can also be used in the preparation of the polymeric chain segment B but its use is not essential in this step. Thus, for compositions where chain segment B constitutes less than 40 percent by weight such as 10 percent, for example, or chain segment B has an average molecular weight of less than a million, small quantities of hydrogen can be used or hydrogen can be eliminated completely.

Where hydrogen is used to terminate the growth of a polymeric chain of a growing alpha-olefin polymer, a certain amount of such terminated polymeric chains are believed to be present in the final composition as random copolymer or homopolymer chains, that is, they do not form block copolymers and as a consequence, the ultimate composition is believed to be a mixture of block copolymers according to this invention with minor amounts of homo and random copolymers of the particular alpha-olefin monomers employed. The compositions of this invention, nevertheless, possess the unique feature, particularly the block copolymers of propylene and ethylene, of non-blushing when creased or when a stress is applied to a particular area such as by folding of a sheet.

THE PREFERRED EMBODIMENTS OF THE INVENTION

The preferred block copolymer compositions of this invention are prepared from the alpha-olefin monomers, propylene and ethylene. In the preferred compositions, propylene is used as the predominant component and ethylene is employed in minor amounts in the polymeric chain segment A. The amount of propylene employed in preparing chain segment A ranges from 90 to 99 percent on a molar basis but preferably from 90 to 98.5 percent. The resulting random copolymer of propylene and ethylene (which possesses crystallinity in the final composition) is preferably followed by a substantially pure homopolymer of propylene so that the final preferred block copolymer composition consists of a random copolymer of propylene and ethylene followed by a block of substantially pure polypropylene.

The propylene-ethylene random copolymer chain segment A preferably constitutes by weight of the final composition from 80 to 95 percent and said chain segment B preferably constitutes from 5 to 20 percent by weight of the final composition. Excellent physical property improvements are noted for compositions within this range, namely contact clarity, melt strength, toughness and impact resistance.

The block copolymers of this invention are preferably prepared by a sequential polymerization process wherein a preformed alpha-olefin random copolymer is formed by polymerizing two or more alpha-olefin monomers in a hydrocarbon diluent or in bulk to form a slurry, said polymerization being carried out in the presence of catalytic quantities of a catalyst formed by admixing a subhalide of a metal selected from the group of metals of Groups IVa, Va and VIa of the Periodic Table according to Mendeleef and an aluminum compound containing at least one carbon to metal bond and after such polymerization to the desired molecular weight, the preformed copolymer slurry is introduced to a low pressure zone wherein volatile hydrocarbon constituents are flashed from the copolymer to thereby obtain a substantially dry preformed copolymer followed by introducing this preformed copolymer which still contains active catalyst residues into a continuously agitated reaction zone maintained at pressures of from 0 to 100 p.s.i.g. and temperatures of from 60° to 195° F. and introducing an alpha-olefin monomer into said continuously agitated reaction zone and polymerizing said alpha-olefin monomer onto the preformed random copolymer to an extent of from 4 to 40% by weight based on the total weight of the polymer.

Briefly, the preferred polymerization process includes the steps of forming a random copolymer in a suitable reaction zone, employing a hydrocarbon diluent or employing a bulk reaction where at least one of the monomers is in liquid form and a catalyst for the polymerization, as defined heretofore, carrying out the polymerization to a solids content of from 5 to 60%, but preferably 20 to 40% to form a prepolymer which can be treated according to the subsequent steps. The copolymer (prepolymer) from the reaction zone, is next taken to a low pressure zone, such as a cyclone, but preferably a bag-filter cyclone combination wherein the volatile constituents are flashed from the polymer and taken through the filter, processed according to known techniques and recycled to the reaction zone, the amount of volatiles removed being sufficient so that no more than 5% volatile content remains in the prepolymer. In the preferred method of carrying out the block polymerization reaction, herein referred to as a vapor phase block polymerization, the prepolymer from the cyclone is taken to one or more continuously agitated reaction zones containing provisions therein for introducing an alpha-olefin monomer at one or more points along the length of said zones (and inert gases such as nitrogen) so that the active catalyst residues in the prepolymer polymerize said alpha-olefin monomer to a block thereby modifying the ultimate properties of the resin produced. The polymerization in the continuously agitated reaction zones is carried out at pressures generally lower than those used for the prepolymer preparation. The block polymer formed in the continuously agitated reaction zones in continuous operation is then taken to suitable deashing facilities for inactivation, solubilization and removal of catalyst residues.

Propylene in the preferred method of this invention is introduced into the reactor in liquid form along with ethylene and catalyst components titanium trichloride and diethylaluminum monochloride. Polymerization is accomplished in the reactor at pressures of about 150 to 750 p.s.i.g. to a solids content of from 20 to 40 percent. The polymer forms as particles in the diluent (propylene and/or propane or butane) and is withdrawn from the reactor as a slurry continuously or substantially continuously.

Block copolymerization is next accomplished according to the preferred embodiment by introducing propylene to a vapor phase reactor and after the addition of the desired amount of block homopolymer to the random propylene-ethylene copolymer, the total polymer is removed to a suitable deashing surge vessel.

Although catalytic materials which have heretofore been indicated as useful include a metal subhalide from the Groups IVa, Va and VIa of the Periodic Table according to Mendeleef, for example, titanium trichloride and the subhalides of vanadium, zirconium, thorium, etc., the preferred Group IVa metal is titanium trichloride and more specifically titanium trichloride cocrystallized with aluminum chloride according to the formula $nTiCl_3 \cdot AlCl_3$ where $n$ is a number of from 1 to 5. As activators for the titanium trichloride, the aluminum compounds containing at least one carbon to metal bond are preferred. Exemplary of such compounds are trialkyl aluminums wherein the alkyl groups contain from 1 to 10 carbon atoms, but preferably aluminum triethyl or dialkyl aluminum monohalides wherein the alkyl groups contain from 1 to 10 carbon atoms and the halide is chlorine.

Temperatures at which the prepolymer formation can be carried out are those known in the art, for example, from 50° to 250° F., but preferably from 70° to 180° F. The reactor pressures in the prepolymer formation can range from atmospheric or below where normally liquid inert hydrocarbon diluents are used (heptane or hexane) to pressures up to 1,000 p.s.i.g. or higher where the monomer(s) is used as its own dispersing agent or the monomer in admixture with a normally gaseous hydrocarbon diluent such as propane or butane, which are liquid under the conditions of the reaction.

In the block copolymerization reaction, polymerization temperatures can be the same as in the prepolymer formation, for example, from room temperature to 195° F., but preferably from 130° to 175° F. Since, in the preferred embodiment of this invention, the reaction is carried out in vapor phase, the pressures are lower than those used in preforming the polymer, that is, pressures of 10 to 50 p.s.i.g. or somewhat higher. Deashing of the finished composition can be accomplished with alcohols or mixtures of alcohols and hydrocarbons such as heptane and an aliphatic alcohol of 1 to 4 carbon atoms at suitable temperatures as is well known in the art.

The following specific examples illustrate the preparation of the novel compositions of this invention.

Properties of the block copolymers as prepared herein were determined as follows: (a) Melt Index: expressed in decigrams per minute as measured by ASTM–D–1238–57T employing a temperature of 230° C., (b) Percent Olefin Incorporation: determined by infrared analysis; (c) Percent Heptane Insolubles: the polymer is extracted with boiling n-heptane; (d) Melting Point: the peak temperature obtained from a differential scanning colorimeter (Model DSC–1 from Perkin-Elmer Co.), a commercial instrument, using a programmed temperature rate of 10° C. per minute. This temperature is below the crystalline melting point by approximately 5° C. For the preferred block copolymers of this invention, the melting point ranges from 150 to 160° C., depending on the amount of ethylene present; (e) Charpy Impact Brittleness Test Temperature ° C.: ASTM–D–256–56, Method B; and (f) Tensile Strength at Yield, p.s.i.: ASTM designation D–638–60T. Other tests will be identified hereinbelow.

In the following four runs summarized in Table I below, the reactor was operated according to the following conditions. In each case the amount of catalyst employed was sufficient to form the desired block copolymer, but, in general, the amounts can range from 0.01 to 10 weight percent of the liquid monomer or diluent present in the reaction zone. The mole ratio of the aluminum to titanium ranged 0.01:1 to 3:1, preferable 0.05:1 to 0.5:1.

Random copolymer reactor conditions

Temperature: 138 to 140° F.
Residence time: 1.5 to 2.0 hours.
Ethylene: 2 to 2.5 weight percent introduced.
Catalyst: Titanium trichloride cocrystallized with aluminum chloride and activated with diethylaluminum monochloride.

Block copolymer reactor conditions

Temperature: 165 to 180° F.
Residence time: 2 to 2.5 hours.
Post propylene block, percent: Varies according to product—4–16%.
Monomer partial pressure: 10–32 p.s.i. depending upon block desired.

Table I below illustrates the polymerization conditions used in Runs 1 through 4:

TABLE I

| Run Number | 1 | 2 | 3 | 4 | 5 |
|---|---|---|---|---|---|
| Reactor conditions using liquid propylene: | | | | | |
| Temperature, ° F | 135 | 135 | 138 | 138 | 138 |
| Residence time, hours | 1.9-2.1 | 1.7-2.1 | 1.7-2.1 | 1.4-1.7 | 1.4-1.7 |
| Solids, percent | 35 | 37 | 37 | 37 | 37 |
| Ethylene, percent comonomer | 2.5 | 2.5 | 2.5 | 2.5 | 2.5 |
| Block copolymer reactor conditions: | | | | | |
| Temperature, ° F | 140-150 | 160-175 | 160-175 | 160-175 | 150-165 |
| Residence time, hours | 2.5 | 2.5 | 2.5 | 2-2.5 | 2-2.5 |
| Total pressure, p.s.i.a | 38-39 | 38-39 | 33-34 | 38-39 | 38-39 |
| Monomer, partial pressure, p.s.i | 25-30 | 25-30 | 25-30 | 25-30 | 15-20 |
| Percent propylene block | 7 | 12-16 | 12-16 | 12-16 | 4-8 |

In the above runs, several thousand pounds of polymer were produced in each run.

Table II below illustrates some of the physical properties of the compositions of this invention and for comparison, the properties of a straight random copolymer of propylene and ethylene (does not contain a polypropylene block, but contains 97.5 percent propylene and 2.5% ethylene on a molar basis). Since Runs number 4 and 5 actually involved a prolonged run, i.e., several days, only a representative composition of the various "lots" produced during each of these runs is included.

TABLE II

| Run Number | 1 | 2 | 3 | 4 | 5 | 6 (St. random) |
|---|---|---|---|---|---|---|
| Ethylene incorporated, percent by infrared | 2.5 | 2.5 | 2.5 | 2.5 | 2.5 | 2.5 |
| Post propylene block, percent | 8 | 14 | 12-16 | 12-16 | 4-8 | 0 |
| Melt flow | 2.3 | 2.2 | 1.9 | 1.8 | 1.2 | 2-3 |
| Heptane insolubles, percent | 87.4 | 91.2 | 91.2 | 87.0 | 87.2 | 86-90 |
| Volatiles, p.p.m | 700 | 353 | 52 | 150 | 239 | |
| Izod impact (at room temperature) | 1.3 | 1.3 | 0.9 | 1.4 | 1.5 | 0.8-1.0 |
| Flexural stiffness, M [1] p.s.i | 80 | 73 | 99 | 99 | 85 | 70-90 |

[1] M = Thousands.

From the above, it can be seen that the copolymer from Run number 6 had in general a lower Izod impact value, as well as a flexural stiffness value, than the block copolymers of this invention. A flat thin section of this random copolymer when compared to an equivalent section of any of the block copolymers of the above runs was inferior in kind in respect of contact clarity. Extrusion tests such as in blow molding operations also revealed that the melt strength of this random copolymer was inferior to that of any of the block copolymers of the above runs.

The percent heptane insoluble content of the block copolymers of this invention illustrate for polymers of this type, that is, where propylene is the major component used, a substantial degree of crystallinity. Heptane insolubility for the compositions in general ranges from about 85 to 92, while density is about 0.895, but can range from about 0.88 to about 0.90.

In blow molding operations, the compositions of this invention have surprisingly exhibited increased melt strength for polymers of melt flow in the range of 2 to 3. Heretofore, homo- and random, as well as block copolymers of alpha-olefin polymers such as those of propylene and ethylene could not be extruded satisfactorily in parison form from a blow molding machine unless the melt flow of the polymers was below 2, that is, about 0.5 to 1. If a polymer of a melt index in the range of 2 to 3, for example, was used, the parison would sag, that is, the free hanging parison which is supported only from the extrusion head would begin to sag, that is, the hot melt strength of the polymer was not sufficient to hold the parison shape.

In blow molding operations, the process consists essentially of extruding a thick wall tube (parison) downward. After the parison is extruded to a particaular length, a split mold closes around it and pinches at the bottom and top, while a cutoff knife severs the parison from the extrusion head and the parison is inflated against the walls of the mold. The most common equipment for blow molding in the industry is the type that extrudes a free hanging parison, so that such parison is supported only from the extrusion head. Recently, other types of equipment have been developed which utilizes a centering pin upon which the free end of the parison locates just shortly before the mold closes around the parison. The problem of hot melt strength consequently is minimized in equipment of the latter type, since the parison is no longer hanging free from the extrusion head, but is supported to some extent by the centering pin.

Good hot melt strength is necessary in blow molding equipment where no centering pin is employed, that is, where the parison is supported only from the extrusion head. Good hot melt strength is also necessary since it will control the amount of thinout of the parison as the weigth of the parison increases during extrusion. Thus, it is quite common for the compositions of the present invention to experience little or no thinout when amounts of about 90 grams of resin for a 32 ounce detergent bottle are extruded. Most polypropylenes of the prior art exhibited good hot metl strength only at melt index values of about 0.5, whereas, as noted above, the compositions of the present invention possess this property when the copolymers have a melt index of from 2 to 3.

Extrudate swell measurements on the random propylene-ethylene post propylene block copolymers of this invention indicate differences in swell exist between such copolymers and straight random copolymers, that is, those in which only a minor amount of ethylene is used in the copolymerization reaction (for the same melt flow or melt index range). The compositions of this invention, in general, exhibit much higher swell ratios than the random copolymers and, in addition to this, as noted above, higher melt strengths and, in general, the swell ratio is directly related to the percent post polypropylene block.

In addition to the foregoing information concerning the preferred copolymers of this invention, namely the propylene-ethylene copolymers, further physical property information for block copolymers containing from 12 to 16 percent polypropylene block is as follows: Melting Point—157° C.; Izod Notched Impact Strength as determined by ASTM D–256 at 73° C. equals about 1.0 foot lbs./in. at 73° F. and 0.3 at 0° F.; Tensile Yield Strength p.s.i. at 73° F. is 4400 as determined by ASTM D–638; Ultimate Elongation, percent at 73° F. is 100 min. as determined by ASTM D–638; Tensile Modulus p.s.i. at 73° F. is 175,000 per ASTM D–638; Flexural Modulus p.s.i. at 73° F. is 135,000 per ASTM D–790; Flexural Stiffness, p.s.i. at 73° F. is 120,000 per ASTM D–747; Deflection Temperature, ° C. at 77 p.s.i. is 98 per ASTM D–648 and Rockwell Hardness "R" per ASTM D–785 is 84.

Further comparisons were made employing the ASTM low temperature brittleness Charpy test method identified above comparing a homopolymer of average molecular weight of about 300,000 to 400,000 and having a heptane insoluble content of about 95%, a block copolymer consisting of a substantially pure polypropylene prepolymer block and containing attached a random copolymer block of ethylene and propylene, the random copolymer consisting of about 8 to 12 percent by weight of the block and the total percent ethylene in the composition being about 4 to 5.5 percent on a molar basis and having a heptane insoluble content of about 87% and a block copolymer of this invention, namely one containing from 12 to 16 percent of a substantially pure post polypropylene block by weight with a prepolymer block of a random propylene-ethylene copolymer, the total ethylene contained in said composition being about 2.5% on a molar basis. The results are shown in Table III below. The values are reported in foot lbs. per inch of notch where this applies.

TABLE III

| Temperature, °C. | Homopolymer | | Polymer composition block copolymer (ethylene-propylene random block) | | Block copolymer of this invention | |
|---|---|---|---|---|---|---|
| | Notched | Unnotched | Notched | Unnotched | Notched | Unnotched |
| −60 | 0.21 | 2.6 | 0.23 | 2.9 | 0.21 | 3.1 |
| −30 | 0.21 | 2.7 | 0.23 | 5.3 | 0.21 | 3.3 |
| 0 | 0.22 | 6.5 | 0.34 | 13.0 | 0.23 | 26.0 |

The foregoing are typical values which can, however, vary on the plus side by the incorporation of certain additives such as nucleating agents or by varying the post polypropylene block length.

As noted herein before, the copolymers of this invention possess improved impact strength as well as improved hot melt strength when compared to other prior art copolymers. The ability to utilize a higher melt flow resin, for example, one of a melt index of 2 to 3 in certain molding operations not only is advantageous from the standpoint of improved hot melt strength in comparison to other copolymer resins but also from the standpoint of being able to fill intricate parts of a mold at lower processing temperatures in comparison to lower melt strength resin equivalents and ability to extrude such resins at commercially feasible rates as compared to lower melt index resins of equivalent properties for a desired end use. Thus for sheeting uses the copolymer resins of the prior art required a melt flow (index) of about 1 or below for adequate impact strength while a suitable range for equivalent impact properties is 2 to 3 for the copolymer resins of this invention.

The improved impact strength of the propylene-ethylene block copolymers of this invention makes them useful in the packaging field such as in packaging, toiletries, cosmetics, drugs and pharmaceuticals as well as food and condiments. The feature of contact clarity is, of course, of paramount importance in certain of these uses. In tests conducted with water-filled 32 ounce detergent bottles blow molded from the preferred copolymers herein, drop tests, at room temperature of 48 inches were successfully passed by these resins while at heights of nine feet a 50% breakage occurred at room temperature for water-filled 8 ounce Boston Round bottles. These tests demonstrate the improvement in impact strength of these resins over the unmodified propylene homopolymer which is brittle at room temperature and over certain other copolymers of propylene and ethylene which failed these tests.

Although examples have been illustrated above showing only the preparation of random propylene-ethylene copolymers followed by substantially pure propylene blocks, the process described is adaptable for the preparation of other block copolymers. Thus, operating at substantially atmospheric pressure under the conditions illustrated for propylene block copolymers, 4-methyl-pentene-1 can be copolymerized in bulk with hexene-1 in amounts of from 1 to 10 percent on a molar basis and to the resulting solid random copolymer after removal of unreacted monomers there can be attached a substantially pure 4-methyl-pentene-1 polymer block in amounts of 4 to 40% on a weight basis, the block copolymerization reaction being carried out in vapor phase or in the presence of an inert hydrocarbon diluent. Similarly, ethylene can be copolymerized in a diluent with 1 to 10 percent on a molar basis of a comonomer such as propylene or butene-1 and to the resulting solid random copolymer there can be added a substantially pure block copolymer of ethylene in amounts of from 4 to 40 percent by weight.

Resort can be had to modifications and equivalents of this invention.

I claim:

1. A process for preparing an ethylene-propylene block composition comprising:
   (1) copolymerizing ethylene and propylene in the presence of a catalytic amount of a catalyst formed by admixing a subhalide of a metal selected from the metals of Groups IVa, Va and VIa of the Periodic Table according to Mendeleef and an aluminum compound containing at least one carbon to metal bond and in a slurry to a solids content of 5% to 60% by weight to form a random copolymer pre-block comprising 90% to 99% on a molar basis of propylene and which has an average molecular weight of from 50,000 to 500,000 and exhibits a crystalline structure under X-rays,
   (2) removing any volatiles present with said pre-block to a level of no more than 5% by weight,
   (3) transferring said pre-block while it still contains active catalyst to a continuously agitated reaction zone,
   (4) introducing propylene to said reaction zone,,
   (5) block polymerizing said propylene of step (4) onto said pre-block, in the vapor phase and in the absence of hydrogen to form a homopolymer post-block having an average molecular weight from 20,000 to 2,000,000 and exhibiting a substantial crystalline structure under X-rays, said post-block constituting 4% to 40% by weight of the total ethylene-propylene block copolymer composition, and
   (6) recovering an ethylene-propylene block copolymer composition having contact clarity when molded into thin sections.

2. A process according to claim 1 wherein said post-block constitutes 4%–16% by weight of the total ethylene-propylene block copolymer composition.

3. A process according to claim 1 wherein the subhalide of a selected metal is titanium trichloride or titanium trichloride cocrystallized with aluminum chloride according to the formula $nTiCl_3 \cdot AlCl_3$ wherein $n$ is an integer of 1 to 5.

4. A process according to claim 3 wherein the aluminum compound is a trialkyl aluminum wherein the alkyl groups have 1 to 10 carbon atoms or a dialkyl aluminum monochloride wherein the alkyl groups have 1 to 10 carbon atoms.

5. A process for preparing an ethylene-propylene block copolymer composition comprising:
   (1) copolymerizing ethylene and propylene in the presence of a catalytic amount of a catalyst formed by admixing a subhalide of a metal selected from the metals of Groups IVa, Va and VIa of the Periodic Table according to Mendeleef and an aluminum compound containing at least one carbon to metal bond and in a slurry to a solids content of 5% to 60% by weight to form a random copolymer pre-block comprising 90% to 99% on a molar basis of propylene and which has an average molecular weight of from 50,000 to 500,000 and exhibits a crystalline structure under X-rays, (2) removing any volatiles present with said pre-block to a level of no more than 5% by weight, (3) transferring said pre-block while it still contains active catalyst to a continuously agitated reaction zone, (4) introducing propylene to said reaction zone, (5) block polymerizing said propylene of step (4) onto said pre-block, in the vapor phase and in the absence of hydrogen to form a homopolymer post-block having an average molecular weight of from 20,000 to 2,000,000 and exhibiting a substantial crystalline structure under X-rays, said post-block constituting 4% to 40% by weight of the total ethylene-propylene block copolymer composition, and (6) recovering an alpha-olefin block copolymer composition having a melt flow in the range of 2 to 3 and contact clarity when molded into thin sections.

6. A process according to claim 5 wherein said post-block constitutes 4%–16% by weight of the total alpha-olefin block copolymer composition.

7. An ethylene-propylene block copolymer composition having contact clarity when molded into thin sections, comprising (a) 80% to 95% by weight of a pre-segment consisting essentially of a random copolymer of (1) 90–98.5 mole percent of propylene and (2) 1.5–10 mole percent of ethylene, said pre-segment being formed in a first reaction zone and having an average molecular weight of from 50,000 to 500,000 and exhibiting a crystalline structure under X-rays, and (b) 5% to 20% by weight of a post-segment consisting essentially of a homopolymer of propylene, said post-segment being formed in the absence of hydrogen in a reaction zone subsequent to said first reaction zone and having an average molecular weight of from 20,000 to 2,000,000 and exhibiting a crystalline structure under X-rays.

8. An ethylene-propylene block copolymer composition according to claim 7 wherein the post-segment constitutes 12–16% by weight of the total composition.

9. An ethylene-propylene block copolymer composition comprising (a) 80% to 95% by weight of a pre-segment consisting essentially of a random copolymer of (1) 90–98.5 mole percent of propylene and (2) 1.5–10 mole percent of ethylene, said pre-segment being formed in a first reaction zone and having an average molecular weight of from 50,000 to 500,000 and exhibiting a crystalline structure under X-rays, and (b) 5% to 20% by weight of a post-segment consisting essentially of a homopolymer of propylene, said post-segment being formed in the absence of hydrogen in a reaction zone subsequent to said first reaction zone and having an average molecular weight of from 20,000 to 2,000,000 and exhibiting a crystalline structure under X-rays, said ethylene-propylene block copolymer composition having a melt flow in the range of 2 to 3 and contact clarity when molded into thin sections.

References Cited

UNITED STATES PATENTS

| | | | |
|---|---|---|---|
| 3,301,921 | 1/1967 | Short | 260—878 |
| 3,378,606 | 4/1968 | Kontos | 260—878 |
| 3,378,607 | 4/1968 | Jones et al. | 260—878 |
| 3,514,501 | 5/1970 | Leibson et al. | 260—878 |

FOREIGN PATENTS

| | | | |
|---|---|---|---|
| 994,416 | 6/1965 | England | 260—878 |
| 1,019,167 | 2/1966 | England | 260—878 |

JAMES A. SEIDLECK, Primary Examiner

S. M. LEVIN, Assistant Examiner

U.S. Cl. X.R.

260—88.2 R

UNITED STATES PATENT OFFICE
CERTIFICATE OF CORRECTION

Patent No. 3,702,352     Dated November 7, 1972

Inventor(s) IRVING LEIBSON

It is certified that error appears in the above-identified patent and that said Letters Patent are hereby corrected as shown below:

Column 10, line 16, after the words "an ethylene-propylene block"

insert the word -- copolymer --

Signed and sealed this 29th day of May 1973.

(SEAL)
Attest:

EDWARD M. FLETCHER, JR.
Attesting Officer

ROBERT GOTTSCHALK
Commissioner of Patents